July 31, 1962    G. T. GURNEY    3,047,003
FLOW PROPORTIONING SYSTEM FOR FOAM PRODUCING APPARATUS
Filed April 18, 1960

*INVENTOR.*
GORDON T. GURNEY
BY
*Kenway, Jenney, Witter & Hildreth*
ATTORNEYS

United States Patent Office 3,047,003
Patented July 31, 1962

3,047,003
FLOW PROPORTIONING SYSTEM FOR FOAM
PRODUCING APPARATUS
Gordon T. Gurney, Worcester, Mass., assignor to The Gamewell Company, Worcester, Mass., a corporation of Delaware
Filed Apr. 18, 1960, Ser. No. 22,909
8 Claims. (Cl. 137—100)

This invention relates to a novel and improved flow proportioning system for use with foam producing apparatus used in fire fighting equipment. More particularly, this invention relates to a novel and improved system for mixing water and foam liquid in a desired proportion and under pressure to provide a foam liquid-water solution which may be mixed with air by a suitable nozzle in order to convert the foam solution into a fire fighting foam.

In the proportionate mixing of foam liquid and water to provide a foam solution which will, in turn, provide a foam satisfactory for the purpose intended, it is necessary that the percentage of foam liquid to water in the solution be maintained within a very narrow range. Where the rate of flow of the water is constant or varies over a small range, it is possible with systems heretofore available to maintain a proper foam liquid-water ratio. However, in cases where the rate of flow of water may vary from a low value of, say, 100 gallons per minute to a high value of, say, 900 gallons per minute, prior systems have not generally provided the accuracy desired in the proportioning of foam liquid to water, particularly in the lower end of the water flow rate range. Also, with prior systems the accuracy of the proportioning might vary to an undesirable extent with changes in the desired ratio of foam liquid to water.

Accordingly, it is the primary object of this invention to provide a novel and improved foam liquid and water proportioning system which will provide increased accuracy of proportioning over a wide range of water flow rates and over a relatively wide range of water-foam liquid ratios.

It is another object of this invention to provide a novel and improved foam liquid and water proportioning system which will automatically provide variation in foam liquid flow rate in response to changes in the demand for water. Included within this object is the provision of such a novel and improved proportioning system which will maintain the desired water-foam liquid ratio with an improved degree of accuracy.

Other objects will be in part obvious and in part pointed out more in detail hereinafter.

The invention, accordingly, consists in the features of construction, combination of elements and arrangement of parts which will be exemplified in the construction hereafter set forth and the scope of the application of which will be indicated in the appended claims.

Figure 1:
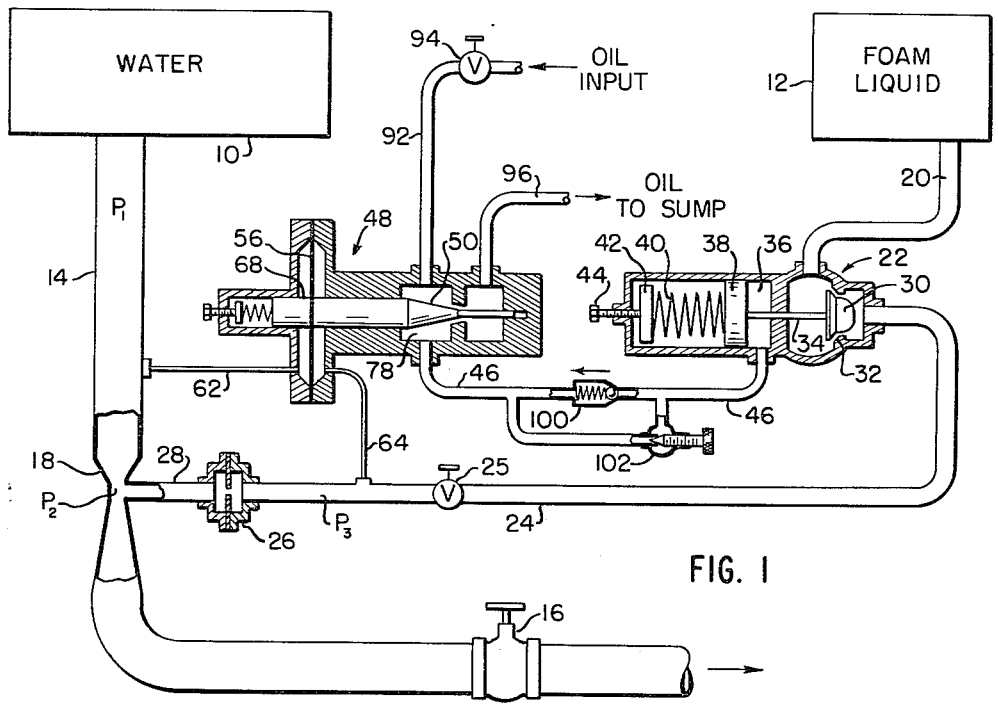
Figure 2:
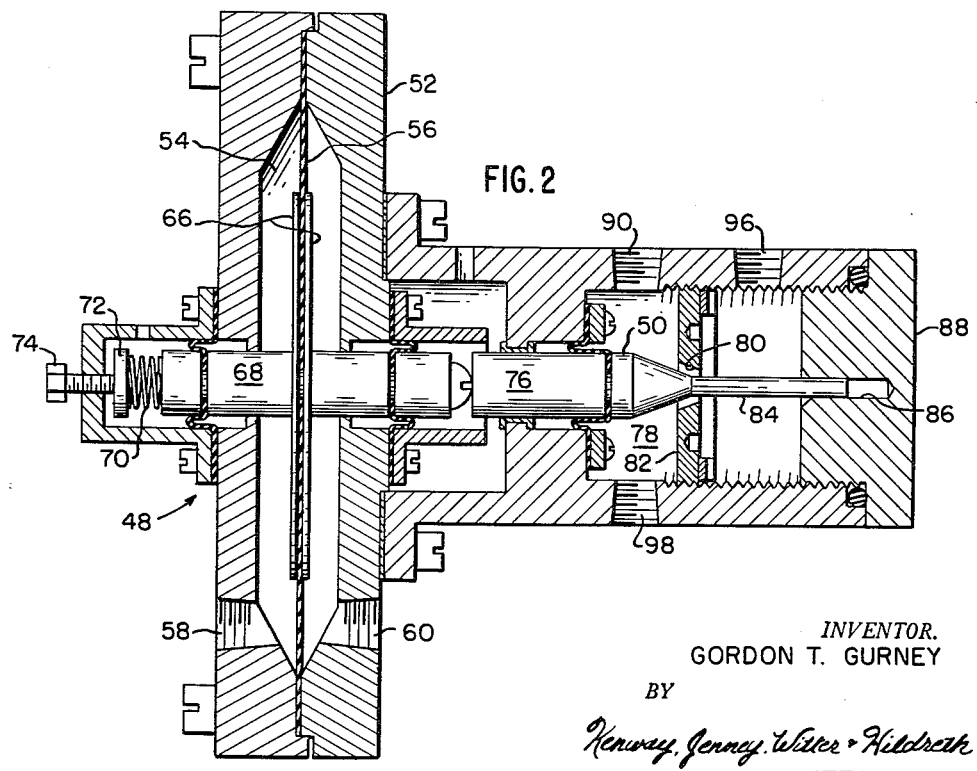

In the drawings:
FIG. 1 is a diagrammatic representation of a foam liquid and water proportioning system incorporating the present invention; and
FIG. 2 is an enlarged cross sectional view of one of the elements of the system of FIG. 1.

With reference to FIG. 1 of the drawings, a foam producing system of the type with which this invention is concerned comprises a source 10 of water and a source 12 of foam liquid or concentrate. Water from the source 10 is supplied under pressure through a pipe or conduit 14 to a suitable foam nozzle (not shown). A valve 16 is provided for the selective adjustment of the rate of flow of water through the conduit 14 to the foam nozzle. If desired, the valve 16 may be incorporated in the foam nozzle. The conduit 14 includes a venturi-like element 18 through which all of the water in the conduit 14 passes and which is disposed upstream of the valve 16 and serves as a water control orifice. The foam liquid is supplied under pressure through a conduit 20 leading from the foam source 12 to the inlet of a throttling valve 22. The outlet of the valve 22 is connected to a conduit 24 including a shut off valve 25 and leading to the inlet of a suitable selectively adjustable metering valve 26 serving as an adjustable foam liquid control orifice. The outlet of the metering valve 26 is connected by a conduit 28 to the throat portion of the venturi portion 18.

It will be apparent that the difference between the pressure $P_1$ of the water in the conduit 14 upstream of the venturi 18 and the pressure $P_2$ in the throat of the venturi portion will be representative of the flow rate of the water through the conduit 14, inasmuch as this pressure difference represents the pressure drop across the water control orifice means. Further, it will be apparent that the difference between the pressure $P_3$ of the foam liquid upstream of the metering valve 26 and the pressure $P_2$ in the venturi throat will determine the flow rate of the foam liquid into the conduit 14. The throat pressure $P_2$ will, of course, vary with the demand for foam solution, or, in other words, water flow rate. With the proper selection of the configuration of the adjustable metering valve 26 relative to the water control orifice means 18, and provided the foam liquid pressure $P_3$ can be maintained equal to the water pressure $P_1$ so that the pressure drops across the water control orifice means and the foam liquid control orifice means are the same, the ratio of the rate of flow of water to the rate of flow of foam liquid as determined by the setting of the metering valve 26 will be maintained the same, regardless of changes in the demand for foam solution.

It is with the problem of accurately controlling the foam liquid pressure $P_3$ relative to the water pressure $P_1$ that the present invention is particularly concerned, inasmuch as the accuracy of control of the pressure $P_3$ will determine the accuracy of control of the ratio of the water-foam liquid mixture. Changes in the foam liquid pressure $P_3$ are provided by the throttling valve 22 which includes a reciprocable valve member 30 movable toward and away from a valve seat 32. The valve member 30 and valve seat 32 are configured to provide that the flow rate through the valve will vary linearly with the position of the valve member relative to its seat. A valve stem 34 is mounted for movement with the valve member 30 and extends through a dividing wall or partition which is part of a chamber 36 within the housing of the valve 22. The chamber 36 contains a valve member actuating piston 38 mounted for movement with the valve stem 34. A spring 40 biases the piston 38 in a direction corresponding to the movement of the valve member 30 in a closing direction. A spring backing member 42 is disposed within the chamber 36 and is movable in the direction of movement of the piston 38 to vary the preloading of the spring 40. The position of the spring backing member 42 is governed by a manually adjustable control member 44 threadably received within one end of the valve housing and movable in the direction of the piston 38. A conduit 46 is connected to the chamber 36 on the side of the piston 38 opposite the spring 40 to provide for the introduction of pressurized fluid into the chamber 36 to move the piston 38 in a valve opening direction against the force of the spring 40.

The control of the throttling valve 22 to vary the foam liquid pressure $P_3$ is provided by a differential pressure amplifier generally indicated at 48. Briefly, the differential pressure amplifier 48 comprises a control valve member or needle valve 50, the position of which determines the pressure of the fluid in the conduit 46 leading to the throttling valve 22, and with the valve member 50 being actuated in response to a difference in value between the water pressure $P_1$ and the foam liquid pressure $P_3$. More specifically, and with reference to FIGS. 1 and 2, the differential pressure amplifier 48 comprises a split housing 52 having an internal sealed chamber 54. A diaphragm 56 is supported on the housing and within the chamber 54 and divides the chamber 54 into two portions sealed from each other, in part, by the diaphragm. A pair of threaded openings 58 and 60 are provided in the housing 52 for connection to one end each of a pair of conduits 62 and 64, respectively. The other end of the conduit 62 is connected to the conduit 14 upstream of the venturi portion 18 so as to supply water at pressure $P_1$ to the left side of the diaphragm 56 as viewed in FIGS. 1 and 2. The other end of the conduit 64 is connected to the conduit 24 upstream of the foam metering valve 26 and downstream of the throttle valve 22 in order to supply foam liquid, at the pressure $P_3$, to the other side of the diaphragm 56.

The diaphragm is preferably provided with a pair of stiffening plates 66 on opposite sides thereof. A shaft 68 is mounted centrally or coaxially of the diaphragm 56 for movement with the diaphragm and extends at right angles to the general plane of the diaphragm and from the opposite sides of the diaphragm. The shaft 68 is slidably supported on the housing 52 with one end of the shaft being biased by a coil compression spring 70 which urges the shaft, and thus the diaphragm, in a rightward direction as viewed in FIGS. 1 and 2. The end of the spring 70 opposite the shaft 68 abuts a spring backing plate 72 which is movable in the direction of movement of the shaft 68. The backing member is restrained against movement to the left, as viewed in the drawings, by an adjustable member 74. As will be apparent, the preloading of the spring 70 may be adjusted by selective adjustment of the threaded member 74 which has a tool engageable portion disposed outwardly of the housing 52. The rightward end of the shaft 68 bears upon a reciprocable member or piston 76 slidably supported on the housing 52 for movement in the direction of movement of the shaft. The end of the piston 76 opposite the shaft 68 is connected for movement with the needle valve member 50 disposed within a valve chamber 78 internally of the housing 52. The valve member 50 is provided with a tapered or conical end which cooperates with a tapered valve seat 80 in an orifice plate 82 forming one wall of the chamber 78. The valve member 50 is further provided with a stem-like portion 84 extending from the smaller diameter end of the tapered portion of the valve member and coaxially of the valve member. As can be seen in the drawings, the stem 84 extends through the orifice formed by the bordering edge portions of the valve seat and is slidably engaged in an aperture 86 in an end cap 88 on the housing 52. The sliding support of the outer end of the stem 84 assures accuracy of the positioning of the valve member 50 relative to the valve seat 80. The housing 52 is further provided with a threaded opening 90 opening into the valve chamber 78 and which, as shown in FIG. 1, is adapted to be connected to a conduit 92, including an adjustable valve 94, and leading to a constant pressure source (not shown) of high pressure oil or hydraulic fluid. The pressure at the source of oil or control fluid is substantially in excess of the normally encountered differential between the water pressure upstream of the venturi 18 and the foam liquid pressure in the conduit 24 between the orifice 26 and throttle valve 22. A threaded opening 96 is provided in the housing in communication with the side of the orifice plate 82 opposite the valve chamber 78 for the drainage of oil passed by the valve member 50. Another threaded opening 98 is provided in the housing 52 and opens into the valve chamber 78 for connection to the conduit 46 leading to the throttle valve 22. As shown in FIG. 1, it is preferred that the conduit 46 include flow control valve means comprising a one-way ball check valve 100 and a parallel connected flow restriction 102. The check valve 100 which will permit substantially unrestricted flow of control fluid to the differential pressure amplifier 48 from the throttle valve 22 will prevent flow from the amplifier 48 to the valve 22. The flow restriction 102, which is preferably an adjustable needle valve or the like, permits restricted flow from the valve chamber 78 in the differential pressure amplifier to the throttle valve 22. The flow restriction afforded by this valve 102 provides a damping factor in the system to reduce hunting in the system to a negligible amount.

In describing the operation of the flow proportioning system described above, it will first be assumed that the foam solution shut off valve 16 is closed while the foam liquid shut off valve 25 is open and the oil input valve 94 is open a predetermined amount. It will also be assumed that the water in the conduit 14 and the foam liquid in the conduit 20 are under pressure. In this no flow condition, it will be apparent that the pressures $P_1$, $P_2$ and $P_3$ will be equal, assuming that the adjustable metering control valve 26 is open. Accordingly, the diaphragm 56 will be centered in the chamber 54 as shown in the drawings. The presence of high pressure oil or control fluid in the valve chamber 78 of the differential pressure amplifier will, of course, exert a force on the valve member 50 and thus the shaft 68 to tend to move the diaphragm to the left. This hydraulic force on the valve member 50 is balanced by the preloaded spring 70 operating on the other end of the shaft 68.

The valve 94 serves as an adjustable orifice for the conduit 92. Because of this adjustable orifice means between a constant pressure oil supply and the valve chamber 78 on the amplifier 48, the pressure in the chamber 78 will vary with the position of the valve member 50. For example if the valve member 50 is in a position so as to provide a restriction having the same hydraulic characteristic as the restriction provided by the valve 94, the pressure in the chamber 78 would be half the pressure of the oil supplied to the valve 94. However, if the valve member 50 is moved further away from the seat 80 to provide a lesser flow restriction, the pressure in the chamber 78 and conduit 92 downstream of the valve 94 will be reduced. Conversely, if the valve member 50 is moved closer to the seat 80, the pressure in the valve chamber 78 and conduit 92 downstream of the valve 94 will increase. Inasmuch as the conduit 46 is connected to the chamber 78, the pressure in the chamber 36 of the throttle valve will vary with the position of the valve member 50.

The valve member 50 and valve seat 80 are preferably configured to provide that, following an initial opening movement of the valve member 50, the remaining movement of the valve member in an opening direction will be linearly related to the fluid pressure in the conduit 46. The preloading of the spring 70 biasing the diaphragm 56 is selected to provide that when the diaphragm 56 is centered in the chamber 54 and pressurized oil is present in the chamber 78, the spring force will be equal to the hydraulic force on the valve member 50 with the valve member 50 being unseated a predetermined amount. This predetermined amount of unseating of the valve member 50, when the diaphragm is centered, is sufficient to assure that any non-linear position vs. pressure drop performance of the valve during initial movement of the valve member 50 out of engagement with its seat will be avoided, so that during the entire operation of the valve member 50 the valve will have linear position vs. pressure drop performance.

In a specific embodiment constructed in accordance with this invention and with 100 p.s.i.g. oil being supplied to the valve 94, the amount of unseating of the valve member, when the diaphragm was centered, was selected to be sufficient to provide a fluid pressure of 10 p.s.i. in the chamber 78 and thus the conduit 46. Further, the preloading of the spring 40 biasing the throttle valve control piston 38 was selected to be sufficient to preclude opening of the throttle valve by the fluid pressure in the conduit 46 when the diaphragm 56 was centered. It is preferred, though, in the interest of rapid response, that the spring biasing force on the piston 38 in the no flow condition of the system be only a relatively small amount greater than the hydraulic force on the piston. It might be noted here that the connection of the foam liquid supply to the upstream side of the throttling valve member 30 also tends to maintain the valve member 30 seated.

Upon opening of the foam solution flow control valve 16, the foam pressure $P_3$ will drop relative to the water pressure $P_1$. Accordingly, the diaphragm 56 will be moved to the right, as viewed in the drawing, to move the valve member 50 in a closing direction and effect an increase in fluid pressure in the valve chamber 78. Fluid will then flow through the metering valve 102 to the throttle valve 22 to move the piston 38 in a valve opening direction so as to increase the foam liquid pressure $P_3$ in the conduit 24. When the foam liquid pressure $P_3$ exceeds the water pressure $P_1$ the diaphragm will be moved to the left to open the valve member 50 and reduce the pressure of the fluid acting on the throttle valve. The attendant back flow from the throttle valve will be through the one way check valve 100 and needle valve 102. The system, which as should be apparent from the above is a closed loop servo system, will cycle to maintain the pressures $P_1$ and $P_2$ equal with a minimum amount of error. For example, in a specific embodiment of the system, the foam liquid pressure was maintained equal to water pressure to an accuracy of ½" of water in the critical low flow end of a flow rate range of 100 to 900 gallons per minute.

If the demand for foam solution increases, the throat pressure $P_2$ will, of course, drop. Because of the flow restriction afforded by the throttle valve 22, the foam liquid pressure $P_3$ will also drop relative to the water pressure $P_1$. Accordingly, in the manner described above, the differential pressure amplifier 48 will correct the position of the throttling valve member 30 to stabilize the system at a new condition wherein foam liquid pressure $P_3$ will again be equal to water pressure $P_1$. Further, if the foam liquid metering valve 26 is adjusted to vary the ratio of water to foam liquid, the foam liquid pressure $P_3$ will vary relative to the water pressure $P_1$, and the differential pressure amplifier will correct the positioning of the throttle valve to bring the foam liquid pressure back into equality with the water pressure. Thus, it can be seen that the proportioning system of this invention provides automatic maintenance of the flow rate of foam liquid in the desired proportion to the flow rate of the water over a wide range of demand rates of foam solution and regardless of changes in the desired ratio of water to foam liquid. The system provides materially improved accuracy of proportioning as well as sensitivity. The response rate of the system is high to provide rapid and positive control of foam liquid flow rate as discharge requirements vary. An additional advantage of the system is that upon closing of the discharge valve 16, and return of the system to the no flow condition previously described, the throttle valve 22 will be closed automatically so as to preclude inadvertent draining of foam liquid beyond the throttle valve and to preclude undesired mixing of water in the foam liquid lines.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim as my invention:

1. In apparatus for producing fire fighting foam, a water-foam liquid proportioning system comprising, a conduit for conducting water under pressure, a second conduit for conducting foam liquid under pressure, a venturi-like element in said first conduit, said second conduit being connected at one end to the throat of said venturi-like element, metering orifice means in said second conduit, fluid pressure responsive throttling valve means in said second conduit on the side of said orifice means opposite said venturi-like element, and fluid differential pressure amplifier means connected to the first and second conduits and including valve means adapted to be connected to a source of pressurized control fluid and connected to said throttling valve means to supply control fluid to said throttling valve means at a pressure which varies with the differential between the pressure in said first conduit upstream of said venturi-like element and in said second conduit between said orifice means and throttling valve means.

2. In apparatus for producing fire fighting foam, a water-foam liquid proportioning system comprising a first conduit for conducting water under pressure and including a venturi-like element having a throat portion, a second conduit for conducting foam liquid under pressure connected at one end to said throat portion and including metering orifice means, a throttling valve in said second conduit upstream of said orifice means to vary the foam liquid pressure upstream of said orifice means, the throttling valve including fluid pressure responsive valve actuating means, a source of pressurized control fluid, and differential fluid pressure amplifier means connected to said source of control fluid and to said actuating means for providing an amplified fluid pressure to the throttling valve actuating means to actuate the throttling valve in response to a differential in pressure between water in said first conduit upstream of said venturi-like element and foam liquid in said second conduit between said orifice means and throttling valve.

3. In apparatus for producing fire fighting foam, a water-foam liquid proportioning system comprising: a first conduit for conducting water under pressure and including a venturi-like element having a throat portion; a second conduit for conducting foam liquid under pressure connected at one end to said throat portion and including metering orifice means; a throttling valve in said second conduit upstream of said orifice means to vary the foam liquid pressure upstream of said orifice means, the throttling valve including fluid pressure responsive valve actuating means; a source of pressurized control fluid; differential fluid pressure amplifier means including control valve means connected to said source of control fluid and adapted to be connected to said actuating means, and means sensing the fluid pressures in said first conduit upstream of said venturi-like element and in said second conduit between said orifice means and said throttling valve and operatively connected to said control valve means; and means connecting said control valve means and said actuating means including the parallel combination of a check valve and a flow restriction to permit substantially unrestricted fluid to said control valve means from said actuating means and affording substantially increased restriction to fluid flow in the opposite direction.

4. In apparatus for producing fire fighting foam, a water-foam liquid proportioning system comprising a first conduit for conducting water under pressure and including a venturi-like element having a throat portion, a second conduit for conducting foam liquid under pressure connected at one end to said throat portion and including metering orifice means, throttling valve means in said second conduit upstream of said orifice means including a movable valve member and having a substantially linear flow rate versus valve member position characteristic, said throttling valve means further including fluid pressure responsive actuating means for controlling the position of said valve member; a source of control fluid; differential pressure amplifying means comprising control valve means including a movable second valve member, means connecting said source of control fluid to said control valve means, a third conduit connecting said control valve means to said actuating means for the throttling valve member, said control valve means providing a fluid pressure in said third conduit which bears a linear relationship to the position of said second valve member, and fluid pressure responsive means for controlling the position of said second valve member in accordance with the differential between the pressure in said first conduit upstream of said venturi-like element and the pressure in said second conduit between said orifice means and throttling valve, and flow control means in said third conduit providing substantially unrestricted flow to said valve chamber from said fluid chamber and providing substantially increased restriction to fluid flow in the opposite direction.

5. In apparatus for producing fire fighting foam, a water-foam liquid proportioning system comprising: a first conduit for conducting water under pressure and including a venturi-like element having a throat portion; a second conduit for conducting foam liquid under pressure connected at one end to said throat portion and including metering orifice means; throttling valve means in said second conduit upstream of said orifice means including a movable valve member and fluid pressure responsive actuating means for said valve member; a source of control fluid at a constant pressure in excess of the normally encountered differential between the pressure of water in said first conduit upstream of said venturi-like element and the pressure of foam liquid in said second conduit between said orifice means and throttling valve; differential pressure amplifying means comprising control valve means, means connecting said source of control fluid to said control valve means including flow restricting means, a third conduit connecting said control valve means to said actuating means for the throttling valve member, said control valve means including a movable second valve member the position of which determines the fluid pressure in said third conduit relative to the fluid pressure of said control fluid at said source, and means for controlling the position of said second valve member in response to a differential between the pressure in said first conduit upstream of said venturi-like element and the pressure in said second conduit between said orifice means and throttling valve.

6. In apparatus for producing fire fighting foam, a water-foam liquid proportioning system comprising: a first conduit for conducting water under pressure and including a venturi-like element having a throat portion; a second conduit for conducting foam liquid under pressure connected at one end to said throat portion and including metering orifice means; a throttling valve in said second conduit upstream of said orifice means including a movable valve member, a fluid chamber containing a valve member actuating piston operatively connected to said movable valve member, and adjustable spring means biasing the piston in a valve member closing direction; a source of control fluid at a constant pressure substantially in excess of the normally encountered differential between the pressure of water in said first conduit upstream of said venturi-like element and the pressure of foam liquid in said second conduit between said orifice means and throttling valve; differential pressure amplifying means comprising control valve means including a valve chamber having a valve seat and a movable valve member cooperating with said seat, means including second orifice means connecting said source of control fluid to said valve chamber on one side of said seat, drain means communicating with the other side of said seat for conducting fluid passed by said valve member to drain, a third conduit connecting said valve chamber on said one side of the seat to said fluid chamber in the throttle valve on the side of said piston opposite said spring means, and means for controlling the position of the last mentioned valve member in response to a difference in pressure between water in said first conduit up-stream of said venturi-like element and foam liquid in said second conduit between the first orifice means and throttling valve, the valve member controlling means being operatively connected to move the last mentioned valve member in a closing direction when foam liquid pressure is less than water pressure.

7. In apparatus for producing fire fighting foam, a water-foam liquid proportioning system comprising; a first conduit for conducting water under pressure and including a venturi-like element having a throat portion; a second conduit for conducting foam liquid under pressure connected at one end to said throat portion and including metering orifice means; a throttling valve in said second conduit upstream of said orifice means including a movable valve member, said throttling valve having a substantially linear flow rate versus valve member position characteristic, said throttling valve further including a fluid chamber containing a valve member actuating piston operatively connected to said valve member and adjustable spring means biasing the piston in a valve member closing directions; a source of control fluid at a constant pressure substantially in excess of the normally encountered differential between the pressure of water in said first conduit upstream of said venturi-like element and the pressure of foam liquid in said second conduit between said orifice means and throttling valve; differential pressure amplifying means comprising control valve means including a valve chamber having a valve seat and a movable valve member cooperating with said seat, conduit means including an adjustable valve connecting said source of control fluid to said valve chamber on one side of said seat, drain means communicating with the other side of said seat for conducting fluid passed by said valve member, a third conduit connecting said valve chamber on said one side of the seat to said fluid chamber in the throttle valve on the side of said piston opposite said spring means, said control valve means having the characteristic of providing a substantially linear relationship between valve member position and fluid pressure in said third conduit, and means for controlling the position of said valve member in the pressure amplifying means in response to a difference in pressure between water in said first conduit upstream of said venturi-like element and foam liquid in said second conduit between said orifice means and throttling valve, the valve member controlling means being operative to move the last mentioned valve member in a closing direction in response to reduction in foam liquid pressure below water pressure; and flow control means in said third conduit providing substantially unrestricted flow to said valve chamber from said fluid chamber and providing substantially increased restriction to fluid flow in the opposite direction.

8. In apparatus for producing fire fighting foam; a water-foam liquid proportioning system comprising a first conduit for conducting water under pressure and including a venturi-like element having a throat portion; a second conduit for conducting foam liquid under pressure connected at one end to said throat portion and including metering orifice means; a throttling valve in said second conduit upstream of said orifice means including a movable valve member, said throttling valve having a substantially linear flow rate versus valve member position characteristic, said throttling valve further including a fluid chamber containing a valve member actuating piston and adjustable spring means biasing the piston in a valve member closing direction; a source of control fluid at a constant pressure substantially in excess of the normally encountered differential between the pressure of water in said first conduit upstream of said venturi-like element and the pressure of foam liquid in said second conduit between said orifice means and throttling valve; differential pressure amplifying means comprising control valve means including a valve chamber having a tapered valve seat and a movable needle valve member cooperating with said seat, conduit means including an adjustable orifice connecting said source of control fluid to said valve chamber on one side of said seat, drain means communicating with the other side of said seat for conducting fluid passed by said valve member, a third conduit connecting said valve chamber on said one side of the seat to said fluid chamber in the throttle valve on the side of said piston opposite said spring means, said control valve means having the characteristic of providing a substantially linear relationship between needle valve member position and fluid pressure in said third conduit, differential fluid pressure responsive means for moving said needle valve member including a diaphragm, means applying to one side of the diaphragm the pressure in said first conduit upstream of said venturi-like element, and means applying to the other side of the diaphragm the pressure in said second conduit between said orifice means and throttling valve, said diaphragm being operatively connected to said needle valve member to move the same in a closing direction in response to the movement of the diaphragm in the direction of movement thereof corresponding to a negative pressure differential from said one side to said other side of the diaphragm; and flow control means in said third conduit providing substantially unrestricted flow to said valve chamber from said fluid chamber and providing substantially increased restriction to fluid flow in the opposite direction.

References Cited in the file of this patent

UNITED STATES PATENTS

| | | |
|---|---|---|
| 1,466,445 | Brush | Aug. 28, 1923 |
| 2,399,938 | Pett | May 7, 1946 |
| 2,421,325 | Griswold | May 27, 1947 |
| 2,698,717 | Sisco | Jan. 4, 1955 |

FOREIGN PATENTS

| | | |
|---|---|---|
| 857,448 | Germany | Dec. 1, 1952 |